Patented June 5, 1945

2,377,360

UNITED STATES PATENT OFFICE 2,377,360

DRY MOLASSES FOOD COMPOSITION

Sidney Musher, New York, N. Y., assignor to Musher Foundation Incorporated, New York, N. Y., a corporation of New York No Drawing. Application May 11, 1942, Serial No. 442,487

7 Claims. (Cl. 99—6)

This invention relates to the production of a dry powdered or granular molasses food composition which is non-hygroscopic in character.

Many attempts have been made to dry molasses but the procedures suggested are very expensive and the resultant dry molasses product is hygroscopic and extremely difficult to handle.

It is an object of the present invention to produce a molasses composition in dry powedered or granular form which will retain its dry characteristics over long periods of time and even in humid atmospheres and which is relatively easy and economical to produce.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has now been found that where alfalfa is first dried to below 3% moisture, and desirably to less than 1.5% moisture, that the alfalfa has unusually effective dehydrative properties in respect to molasses so that when the alfalfa containing less than 3% moisture is combined with molasses, a dry powdered or granular molasses composition will be obtained having non-hygroscopic properties and capable of flowing like other dry materials.

Alfalfa appears to be usually suited for the production of this dry molasses food composition provided the alfalfa is first subjected to the predrying treatment to under 3% moisture content and then combined with the molasses. Unless the moisture content of the alfalfa is reduced to under about 3%, a sticky hygroscopic mass is obtained which will readily lump and which will not have the desirable free flowing non-hygroscopic characteristics of the product of the present invention.

The alfalfa is pre-dried subjecting it to an elevated temperature of between 135° F. and 200° F. or more, preferably by placing in a steam jacketed vat with agitators, this predrying continuing either at atmospheric or reduced temperatures.

The alfalfa may also be dried by blowing heated air into a revolving cylinder containing the alfalfa, the air temperature reaching as high as 200° F. and more until the alfalfa is dried down to under about 3% moisture.

Ordinary dried alfalfa is not satisfactory for use in accordance with the present invention as the alfalfa must be dried to under about 3% moisture content and preferably to less than 1.5% and then immediately combined with the molasses before the alfalfa has had the opportunity of picking up additional moisture to return to a normal moisture content of 10% to 12%.

In this respect, alfalfa appears to have unusually dehydrative properties and serves both to dry the molasses to a flowable powder, granular or flake form and to protect the molasses against further hygroscopicity.

Following the drying of the alfalfa to less than 3% of moisture, the molasses is added to the alfalfa with vigorous agitation. Atmospheric pressure or reduced pressure may be used.

The molasses desirably should not exceed about 60%, but should preferably be over 25% of the total weight of the finished molasses composition.

The final composition is a dry free-flowing composition which is altogether devoid of the sticky appearance of molasses while retaining the desirable characteristics of the molasses. The preferred proportions of molasses to the completely dried alfalfa are between 35% and 50% of molasses and 65% to 50% of the alfalfa.

Before combining with the molasses, the alfalfa is preferably reduced to finely divided condition of 25 mesh or more in order to enhance the dehydrative properties of the alfalfa.

It has also been found of unusual value and importance to adjust the pH of the molasses or of the alfalfa by the use of organic or inorganic acids so that the final dry molasses composition has about between pH 3 and pH 4.5, whereby a more desirable and more acceptable food product is obtained. In order to accomplish this, the molasses is desirably adjusted to a sufficiently low pH, such as pH 2.5, so that when combined with the specially pre-dried alfalfa, the finished dry powder composition will have a pH between 3 and 4.5. This pH adjustment can be made by the addition of sulphuric acid, hydrochloric acid, or the weaker acids such as lactic acid, acetic acid or tartaric acid.

Although alfalfa is very much preferred for use in accordance with the present invention, there may also be employed other fodder and forage legumes and grasses which include red clover, spring vetch, winter vetch and soya beans and particularly their leaves and stalks, and the cereal grasses and their leaves and stalks such as maize, sorghum, rye, oats, June grass and timothy.

These materials in their normal condition contain not less than about 10% total moisture and they are not satisfactory for use in accordance with the present invention until they have been dried to an abnormally low moisture content at which they will become strongly absorbent of the molasses and particularly of the hygroscopic properties of the molasses.

The final molasses product obtained in accordance with the present invention is not only available in dry powdered or finely divided condition in which it may be exposed to air without the deliquescent characteristics of dehydrated molasses, but in addition the digestible nutrients are fully available and utilizable.

It has been found particularly desirable to utilize for the purpose of the present invention blackstrap molasses, which is the non-crystallizable fraction obtained in the manufacture of cane and beet sugars, such as cane molasses or beet molasses. Although blackstrap molasses is the desired product, there may also be employed sorghum molasses, invert molasses and edible or refinery molasses.

Where desired, after the alfalfa has been predried to under 3% moisture and combined with the molasses, the finished combination may be exposed to an elevated temperature under atmospheric or reduced pressure for a short period of time. This treatment, however, is not required where the alfalfa is completely dried to under 3% moisture content and then immediately combined with the molasses, preferably at pH 3 to 4.5, to obtain the non-hygroscopic, dry, powdered or granular molasses composition.

Having described my invention, what I claim is:

1. A process of producing a dry molasses food composition which comprises drying alfalfa to less than 3% moisture, then immediately combining said predried alfalfa with composition, said composition having been adjusted to a pH between 3 and 4.5 and said molasses being present in an amount between 25% and 60%, whereby the molasses is converted to dry free flowing form and a homogeneous dry molasses food composition is obtained.

2. A process of producing a dry molasses food composition which comprises drying a material selected from the group consisting of the fodder and forage legumes and grasses to less than 3% moisture, then immediately thoroughly admixing said predried material with molasses, said composition having been adjusted to a pH between 3 and 4.5 and said molasses being present in an amount of between 25% and 60%, whereby the molasses is converted to dry, free flowing form and a homogeneous dry molasses food composition is obtained.

3. A process of producing a dry molasses food composition which comprises acidifying molasses to a pH of 2.5, drying a material selected from the group consisting of the fodder and forage legumes and grasses to less than 3% moisture, then immediately thoroughly admixing said predried material with between 25% and 60% of the acidified molasses whereby the molasses is converted to a dry, free flowing form and a homogeneous dry molasses food composition is obtained.

4. A process of producing a dry molasses food composition which comprises acidifying molasses to a pH of 2.5, drying alfalfa to less than 3% moisture, then immediately combining said predried alfalfa with between 25% and 60% of the acidified molasses whereby the molasses is converted to a dry, free flowing form and a homogeneous dry molasses food composition is obtained.

5. An acidified, dry, free flowing, homogeneous molasses food composition, said composition comprising between 25% and 60% of molasses and between 75% and 40% of a material selected from the group consisting of the fodder and forage legumes and grasses, said composition having a pH between 3 and 4.5.

6. An acidified, dry, free flowing, homogeneous molasses food composition, said composition comprising between 25% and 60% of molasses and between 75% and 40% of alfalfa, said composition having a pH between 3 and 4.5.

7. An acidified, dry, free flowing, homogeneous molasses food composition, said composition comprising between 35% and 50% of molasses and between 65% and 50% of a material selected from the group consisting of the fodder and forage legumes and grasses, said composition having a pH between 3 and 4.5.

SIDNEY MUSHER.